(12) United States Patent
Stysley et al.

(10) Patent No.: US 10,141,705 B2
(45) Date of Patent: Nov. 27, 2018

(54) HIGH OUTPUT MAXIMUM EFFICIENCY RESONATOR

(71) Applicant: The United States of America as represented by the Administrator of the National Aeronautics and Space Administration, Washington, DC (US)

(72) Inventors: Paul R. Stysley, Catonsville, MD (US); Donald B. Coyle, Ellicott City, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 360 days.

(21) Appl. No.: 15/007,436

(22) Filed: Jan. 27, 2016

(65) Prior Publication Data

US 2017/0212239 A1    Jul. 27, 2017

(51) Int. Cl.
| | |
|---|---|
| *H01S 3/00* | (2006.01) |
| *H01S 3/02* | (2006.01) |
| *G01S 17/88* | (2006.01) |
| *G01S 7/481* | (2006.01) |
| *G01S 7/484* | (2006.01) |
| *H01S 3/0941* | (2006.01) |
| *H01S 3/16* | (2006.01) |
| *H01S 3/08* | (2006.01) |
| *H01S 3/04* | (2006.01) |
| *H01S 3/115* | (2006.01) |
| *H01S 3/06* | (2006.01) |

(52) U.S. Cl.
CPC .............. *H01S 3/025* (2013.01); *G01S 7/484* (2013.01); *G01S 7/4813* (2013.01); *G01S 17/88* (2013.01); *H01S 3/0405* (2013.01); *H01S 3/08063* (2013.01); *H01S 3/0941* (2013.01); *H01S 3/115* (2013.01); *H01S 3/1611* (2013.01); *H01S 3/1643* (2013.01); *H01S 3/0014* (2013.01); *H01S 3/0606* (2013.01); *H01S 3/08072* (2013.01)

(58) Field of Classification Search
CPC ........ G01S 17/88; G01S 7/4813; G01S 7/484; H01S 3/025; H01S 3/0405; H01S 3/08063; H01S 3/0941; H01S 3/115; H01S 3/1611; H01S 3/1643; H01S 3/0014; H01S 3/0606; H01S 3/08072
See application file for complete search history.

(56) References Cited

U.S. PATENT DOCUMENTS

| | | | | |
|---|---|---|---|---|
| 5,808,732 A | * | 9/1998 | Williams ................. | B64G 1/66 244/171 |
| 5,900,967 A | * | 5/1999 | Zamel ................. | H01S 5/02423 359/337 |
| 2012/0300287 A1 | * | 11/2012 | Starodoumov ........... | G02F 1/39 359/329 |

* cited by examiner

*Primary Examiner* — Armando Rodriguez
(74) *Attorney, Agent, or Firm* — Christopher O. Edwards; Bryan A. Geurts; Mark P. Dvorscak

(57) ABSTRACT

A diode pumped, solid state laser is provided that can produce over 16 billion, 15 mJ, 10 ns Q-Switched laser pulses with a low measured decay rate. The laser can be integrated into a global biomass measuring instrument, and mounted on the International Space Station (ISS).

14 Claims, 6 Drawing Sheets

HIGH OUTPUT MAXIMUM EFFICIENCY RESONATOR

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to a high output resonator laser and the National Air and Space Administration's Global Ecosystem Dynamics Investigation (GEDI) lidar.

BACKGROUND OF THE INVENTION

The drive to test develop solid state laser architectures for space-based remote sensing has been pursued at NASA since the launch of the Mars Orbital Laser Altimeter (MOLA) in 1996. MOLA employed a diode pumped Nd:YAG oscillator-only cavity for mapping the martian surface with a laser developed by what was then MacDonnell Douglas Inc. This crossed-retro surface cavity design fulfilled its full science mission but was limited in lifetime due to the relatively new technology of high power pulsed laser diode arrays at the time. Since then, laser diode array technology has progressed such that they are no longer the limiting factor in flight lasers, but have been replaced by the full laser system "design" that must be qualified and proven to be reliable in space. NASA has actively pursued the progression of risk reduction of such systems for space applications, while improving the lifetime and efficiency. For example, the use of corner cubes, or retro-reflectors, as laser cavity and mirrors demonstrate excellent stability for such extreme environments, but the inherent multimode beam quality is often too "noisy" for modern science measurements with high pointing jitter and shot-to-shot intensity variations. Thus, $TEM_{00}$ beams are now needed for state-of-the-art, high resolution planetary and Earth science altimetry.

SUMMARY OF THE INVENTION

According to various embodiments of the present invention, a laser system is provided that consists essentially of the following components housed in an enclosure: a laser head comprising a diode-side-pumped ND:YAG slab laser configured as a zig-zag slab gain medium; a Q-switch; a ¼ wave-plate; a graded reflectivity mirror; a cylindrical lens; and a high reflectivity mirror. The laser head can be configured to produce a laser beam along an optical path. The Q-switch can be aligned along the optical path and configured to pulse a laser beam produced by the laser head. The ¼ wave-plate can be aligned along the optical path and configured to polarize a pulsed laser beam formed by the Q-switch. The graded reflectivity mirror can be aligned along the optical path and configured to partially reflect and partially transmit a polarized, pulsed laser beam produced by the ¼ wave-plate, and to form a reflected laser beam along a reflected optical path. The cylindrical lens can be aligned along the reflected optical path and configured to focus a reflected laser beam. The high relectivity mirror can be aligned along the reflected optical path and configured to reflect a focused reflected laser beam produced by the cylindrical lens. The laser system can produce 15 mJ $TEM_{00}$ laser pulses, without further amplification, and is robust enough to produce such laser pulses for at least two years, making it ideal for use in lidar instruments designed to analyze the Earth's biomass.

The laser system can be mounted on a spacecraft and direct laser light toward the Earth's surface. A method of analyzing global ecosystems is also provided and comprises generating pulsed laser beams with the laser system, mounted on a spacecraft, directing the pulsed laser beams toward a surface of the Earth, and analyzing reflected laser light returning to the spacecraft after reflecting off of the surface of the Earth. The method can also involve calculating the density of biomass at the surface of the Earth based on the reflected laser light.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

Figure 1:
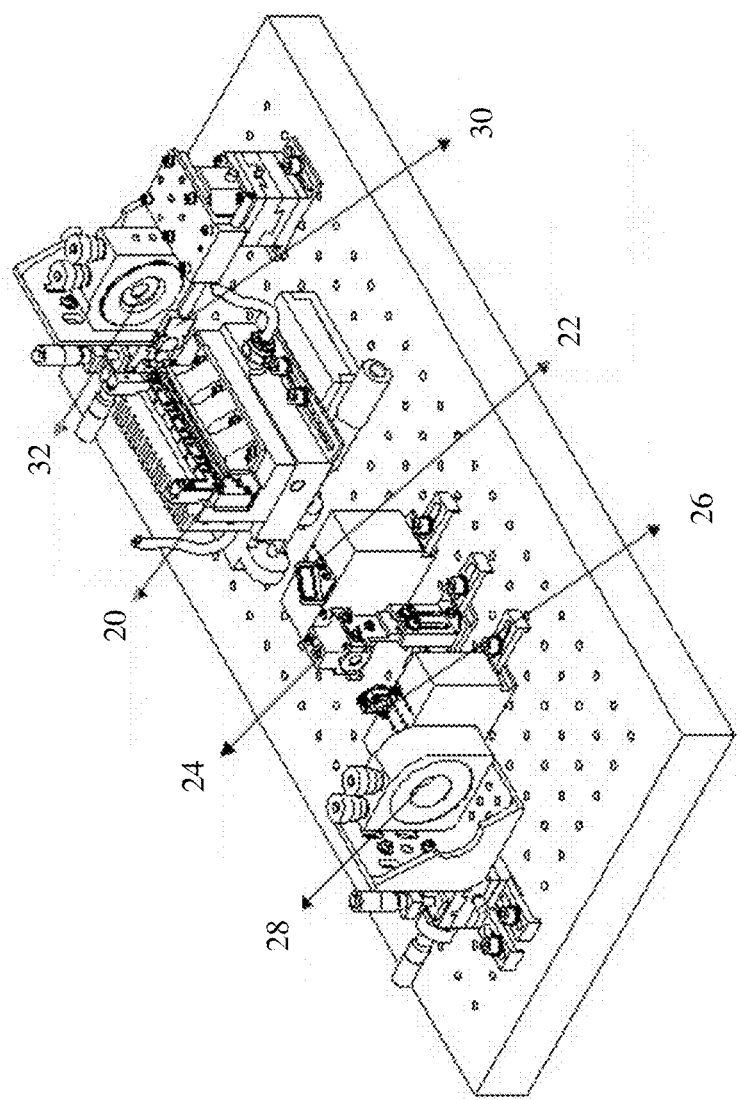
FIG. 1 is a diagram of a breadboard showing components, arrangements, and configurations that can be used in a laser according to various embodiments of the present invention.

According to various embodiments of the present invention, a laser system is provided that comprises a laser head comprising a diode-side-pumped ND:YAG slab laser, a Q-switch, a ¼ wave-plate, a graded reflectivity mirror, a cylindrical lens, and a high reflectivity mirror. The laser system can be free of additional components, and particularly free of any amplifiers or amplification components, such that the laser system can consist of or consist essentially of just these components. The laser head can comprise or be a diode-side-pumped ND:YAG slab laser configured as a zig-zag slab gain medium. The laser head can be configured to produce a laser beam along an optical path. The Q-switch can be aligned along the optical path and configured to pulse a laser beam produced by the laser head. The ¼ wave-plate can be aligned along the optical path and configured to polarize a pulsed laser beam formed by the Q-switch. The graded reflectivity mirror can be aligned along the optical path and configured to partially reflect and partially transmit a polarized, pulsed laser beam produced by the ¼ wave-plate, and to form a reflected laser beam along a reflected optical path. The cylindrical lens, used for thermal lensing compensation, can be aligned along the reflected optical path and configured to focus a reflected laser beam. The high reflectivity mirror can be aligned along the reflected optical path and configured to reflect a focused reflected laser beam produced by the cylindrical lens.

The laser head can comprise, arranged in order, an aluminum diode block, a 7×4 bar laser diode arrays, an aluminum laser head bridge, an undoped:YAG pump lens, a cylindrical pump lens rack, a 22 bounce ND:YAG slab gain medium, and a slab heat sink. The laser head can also comprise a cylindrical thermal compensating lens. The laser system can be mounted in an enclosure and can be configured to hold average internal fluences to below 3.0 J/cm$^2$, for example, to below 2.0 J/cm$^2$. The laser system can be mounted in or on a spacecraft and configured to transmit polarized, pulsed and polarized laser beam, exiting the enclosure, directly toward a surface of the Earth. The enclosure can have a single aperture, and the single aperture can be configured to transmit a polarized, pulsed and polarized laser beam from the graded reflectivity mirror along the optical path to be output from the enclosure.

The spacecraft can be configured and/or oriented to direct polarized, pulsed and polarized laser beam pulses exiting the enclosure, directly toward biomass on the surface of the Earth. The spacecraft, laser system, or both can be configured direct polarized, pulsed and polarized laser beam pulses exiting the enclosure, directly toward biomass on the surface of the Earth, and to turn off the laser system when the spacecraft is in orbit above water-covered surfaces of the Earth, such as when over the Earth's oceans.

According to various embodiments of the present invention, a method is provided for forming 10 mJ TEM$_{00}$ laser pulses, for example, 15 mJ TEM$_{00}$ laser pulses, using the laser system as described herein. Such laser pulses can be formed with the laser system without the need for amplification, and the laser pulses can be directed from the enclosure directly to the Earth's surface. A method of analyzing global ecosystems is also provided according to the present invention and comprises generating and directing pulsed laser beams from a laser system as described herein, from a spacecraft, toward a surface of the Earth. Laser light returning to the spacecraft can be analyzed after reflecting off of the surface of the Earth to determine the biomass at the scanned area of the Earth's surface. The density of biomass at the surface of the Earth can thus be calculated based on the reflected laser light. The method can involve generating and directing 15 mJ TEM$_{00}$ laser pulses using the laser system, and pulsing such laser pulses toward biomass-covered areas of the Earth's surface for at least two years.

Three HOMER lasers as described herein can be employed on an exemplary instrument. The instrument can be used on a mission that can benefit from a highly efficient and reliable laser that is capable of lasting 2 years under continuous operation, and producing over 15 billion shots. The lasers can produce TEM$_{00}$ laser pulses at pulse energies of over ~15 mJ, using an actively Q-switched cavity with an 808 nm side pumped Nd:YAG zig-ag slab, a positive branch unstable resonator, and a gaussian reflective output coupler. The lasers produce TEM$_{00}$ far field beam quality. These cavities allow high pulse energies with good beam quality and high efficiency without the need for intra cavity aperture which can cause small scale self-focusing and degrading optical diffractive effects. The HOMER laser requires measurably less optics than a MOPA system with similar output power. This factor is critically important in the instrument design phase of a flight project, when formulating the mission's cost, mass, and overall hardware complexity.

According to the present invention, it has been determined that a stable Q-switched TEM$_{00}$ Nd:YAG oscillator with spherical end mirrors should not be designed to produce output pulses over 10 mJ. Optical damage rapidly ensues upon the weakest optical surface in the cavity, typically an anti-reflective coated thermal composition lens or intra-cavity wave plate. When a diode-side-pumped, zigzag slab is used for the gain medium in a Q switched oscillator, it was repeatedly found that the weakest optical surface is that of the total internal reflective slab faces. For example, for a non-single frequency (multi-longitudinal mode) Q-switched system such as the HOMER laser configuration of the present teachings, the high frequency, temporal spiking associated with longitudinal mode beating (LMB) becomes the dominant damage trigger. Thus, LMB should be monitored closely throughout the build and testing of any new laser cavity. The present teachings show that the periodic, worst case, LMB peak spiking intensity in the Q-switched pulse envelope must be no greater than 50% above than the average peak voltage; as seen on a fast detector and oscilloscope, each typically at greater than or equal to a GHz bandwidth.

The physics describing these events are a foundation to the present, successful long term production of 15 mJ TEM$_{00}$ pulses with an oscillator-only, zig-zag slab oscillator. By holding the average internal fluences to below 3.0 J/cm$^2$, for example, at below 2.5 J/cm$^2$, or below 2.0 J/cm$^2$, the present invention can provide damage-free operation over repeated tests and optical configurations. In some embodiments, the laser employs a positive branch unstable resonator configuration in concert with a Gaussian reflective output coupler. Fine tuning of end mirror curvatures, internal beam expansion, and other methods of maximizing intra-cavity beam sizes can be applied to reduce the risk of optical damage. Most of these methods add complexity, impede cavity stability, and generally reduce the overall system's reliability, which can be an impediment for any space borne laser-based instrument. The unstable resonator configuration of the present invention, however, allows high pulse energies with good TEM$_{00}$ beam quality and excellent efficiency, surpassing that of many MOPA designs, without the need for intra-cavity apertures. This is important at these non-single frequency pulse energies since the introduction of hard edges (apertures) readily cause small scale, self-focusing and degrading optical diffractive effects.

The HOMER enclosure of the present invention can be a pressurized vessel with a sealed window and hermetic electrical and fiber optic feedthroughs. In order to add extra temperature readings inside for this experiment, however, it may be preferred to remove an energy monitor pick-off fiber port to provide wire access for these added sensors. The unit can still be fully enclosed, torqued, and mounted on flexures, but not pressurized. The system can be designed with mechanical, thermal, and optical tracking to verify the performance requirements for a mission. Two optical reference cubes, one for the enclosure and another for the mounting structure, can be used to isolate any far field beam pointing movement to mechanical or cavity motions. Once calibrated, the set up can run for years and produce tens of billions of lasershots.

The system can be operated, for example, at greater than or equal to 1 mJ pulses, greater than or equal to 5 mJ pulses, greater than or equal to 10 mJ pulses, greater than or equal to 15 mJ pulses, or greater than or equal to 20 mJ pulses. The pulses can be repeated at rates, for example, of from 10 Hz to 1000 Hz, 50 Hz to 500 Hz, 200 Hz to 300 Hz. The system can be operated under such parameters for months or years, for example, for two years or more. Pulsed solid state lasers typically exhibit a degradation in output energy that is likely attributed to pump laser diode emitter loss or gradual decay in their lasing efficiency, but the HOMER configuration of the present invention can provide a surprisingly low degradation rate, for example, of 100 uJ/B or less. According to various embodiments, optimization can be provided by heavily derating the LDA drive parameters beginning of life (BOL) set point of 50 Amps (49% of peak), and using a pulse width of from about 20 to about 100 μs, for example, about 65 μs. Optimization can also be provided by using a large cavity beam area (i.e., low fluence) thus keeping longitudinal mode beating to a minimum. Peak temporal intensity spikes that can slowly pit coatings can thus be kept to an absolute minimum.

According to various embodiments, the laser can be of an oscillator-only design. It can be constructed without the need for an amplifier or further amplification. This oscillator-only design provides the unique capability to fully assemble and align the optics on the optical bench and use a thermal-control plate to simulate the enclosure mounting floor. The enclosure can be fabricated and leak-tested in parallel. When the laser is aligned and all fasteners torqued, the optical bench and laser head assembly can then be easily transferred to the enclosure upon delivery. The enclosure has a double-viton O-ring seal and has passed the minimum leak rate specification of a 2-year deployment in the vacuum of space. The flight HOMER laser can have two fiber optic waveguides to monitor the optical laser performance and provide an optical "start pulse" for the lidar digital electronics.

Three HOMER lasers can be used for missions and can sit in the vacuum of space aboard, for example, the Japanese Experiment Module-Exposed Facility (JEM-EF) platform. This infrastructure provides the mission instrument with power, data handling, and a forced liquid cooling loop for thermal control on the lasers. For a life test as described in the example below, additional temperature readings can be taken inside the enclosure to compare to thermo-mechanical model results. An energy monitor pick-off fiber port can be removed to provide wire access for added temperature sensors. The life test unit can be fully enclosed, torqued, and mounted on flexures, but not pressurized. The laser can go through a thermal vacuum test (TVAC), as well as performance tests with various slower internal pressures to simulate a leak. A detailed data set can be acquired and applied to next generation hardware. Motion and performance effects can be quantified and used in final opto-mechanical design adjustments for the mission flight units.

Referring now to the drawings, and with reference to FIG. 1, a breadboard is shown and exemplifies various components and configurations of a high output maximum efficiency resonator (HOMER) in accordance with various embodiments of the present invention. The HOMER comprises a sealed enclosure (not shown) that can include one, two, or more monitoring windows, and flexures or other mounting brackets, for example, comprising titanium, aluminum, or the like. Trusses, platforms, benches, and the like mounting components can be provided within the sealed enclosure, for example, welded or otherwise affixed to an interior surface of the enclosure. The exemplary breadboard shown in FIG. 1, or other HOMER system as described herein, can be mounted within the sealed enclosure.

As shown in FIG. 1, a HOMER laser system according to various embodiments of the present invention comprises a laser head 20, a thin film polarizer or ½ wave-plate 22, a Q-switch 24, a ¼ wave-plate 26, a graded reflectivity mirror 28, a cylindrical lens 30, and a high relectivity mirror 32. Some embodiments do not include, that is, are free of, a thin film polarizer, a ½ wave-plate, or both. Cylindrical lens 30 can have an F(cyl), for example, of from about −20 cm to about −100 cm, which is selected based on the thermal lensing effects seen in the laser slab.

The HOMER laser hardware can comprise an all-aluminum truss, although Beryllium or other materials can be used. The structure can be optimized for low thermomechanical motion effects. The unit can be mounted in an inverted orientation relative to that shown in FIG. 1. The configuration allows for easy access to the flat surface directly under the laserhead location, and the mounting of a liquid cooled interface plate for precision thermal control.

Figure 2:
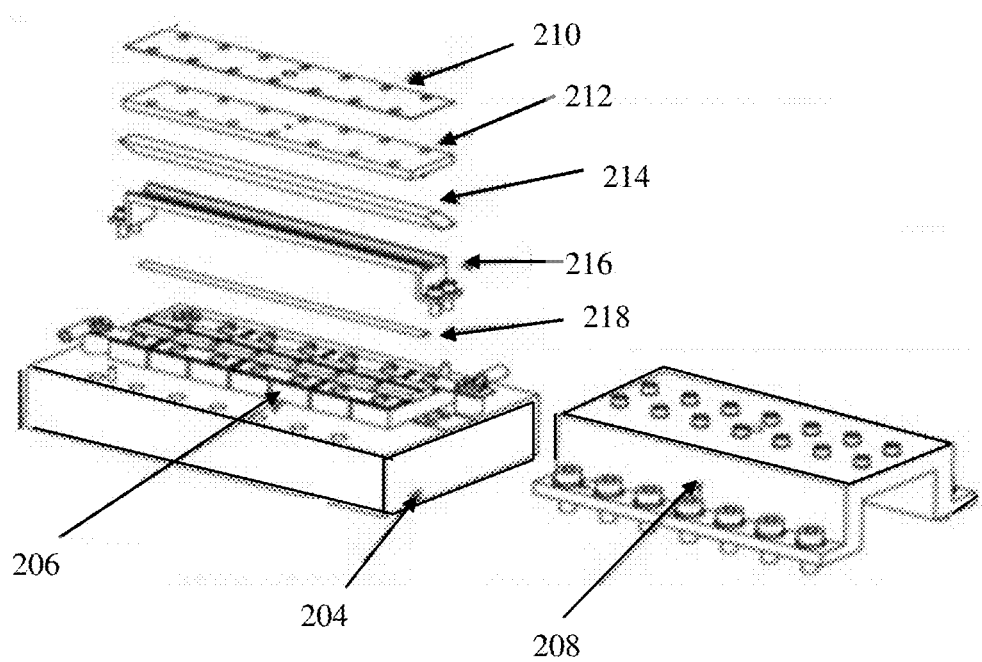
FIG. 2 is an exploded view of the laser head assembly shown in FIG. 1.

FIG. 2 is an exploded view of laser head assembly 20 shown in FIG. 1. The assembly includes an aluminum diode block 204, a 7×4 bar of LDA's 206, an aluminum laser head bridge 208, an undoped:YAG pump lens 218, a cylindrical pump lens rack 216, a 22 bounce ND:YAG slab 214, a CuW slab heat sink 212, and an optional brass shim 210. A thermal compensating lens, for example, a cylindrical thermal compensating lens, can also be included in the laser head.

Figure 3:
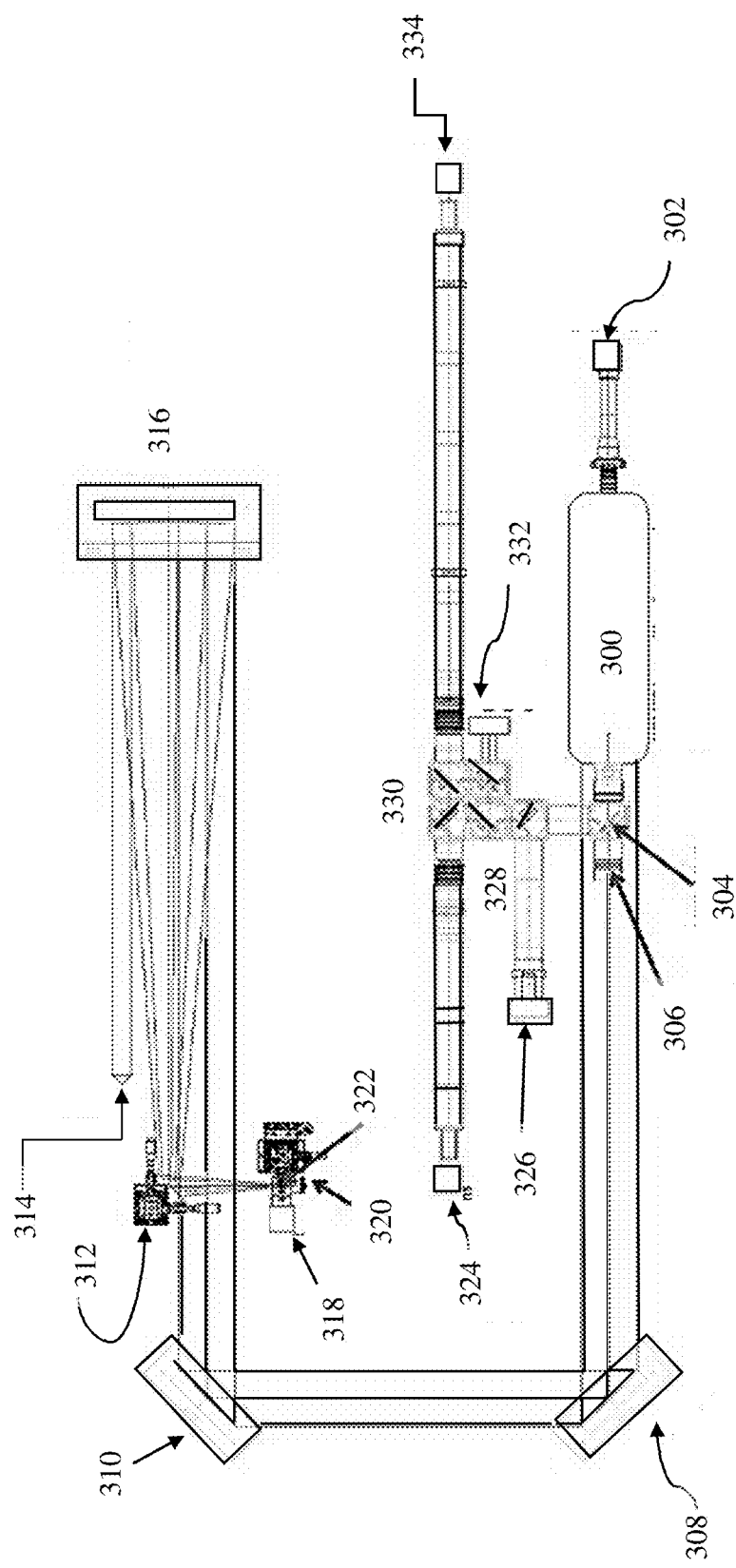
FIG. 3 is a plan view of an optical layout of a laser system according to various embodiments of the present invention.

With reference to FIG. 3, a laser system according to various embodiments of the present invention, is provided. A HOMER laser 300, as described herein, is provided with reference cubes mounted above the output window and on the mounting plate. HOMER laser 300 is in optical communication with a high reflector image camera 302 comprising a 0.4× telecentric lens having an outer diameter (OD) of 3.0, referred to herein as Camera #3. Laser light generated by HOMER laser 300 is directed outwardly to a 95% reflectance/5% transmittance beam splitter 304, having a <1 sec wedge. Laser light transmitted through beam splitter 304 passes through a collimator filter stack 306 having an OD of 6.5 and a <1 sec wedge. The collimated laser light then reflects off of a first turn mirror 308 and then off of a second turn mirror 310 from which it is directed toward and off of a 1.524 m EFL parabola mirror 316 having a 200 mm diameter. From parabola mirror 316 laser light is reflected toward a turn mirror 312 that sends some of the light back toward parabola mirror 316 where it reflects toward a cube corner 314 configured for locating a collimator far field image CCD 318 to a collimator light source 320. Collimator far field image CCD 318 has an OD of 6.5, is referred to herein as Camera #1, and ends up processing 5.0% of the output of HOMER laser 300. Light impinging on collimator far field image CCD 318 is first processed by a collimator light source SMF 320 and a Pellicle beam splitter 322.

The 95% of the laser light from HOMER laser 300 that is reflected by beam splitter 304 is reflected and split through an array comprising two turn mirrors 330 and three 95%/5% beam splitters 328. As a result of the reflection and splitting by the array, about 90.3% of the laser light from HOMER laser 300 is output to an output power meter 326, and about 0.23% is output to a pulse length monitor 332 having an OD of 4.0 and a 1064 filter. As a further result of the reflection and splitting by the array, about 0.24% of the laser light from HOMER laser 300 is output to a far field camera 324 comprising a 500 mm efl lens and having an OD of 6.3, referred to herein as Camera #2, and 4.29% of the laser light from HOMER laser 300 is output to a near field camera image output coupler 334 comprising a 400 mm efl lens focused on the output coupler and providing 1.39× magnification, referred to herein as Camera #4.

A 1064 nm fiber-coupled laser diode can be mounted directly to the master CCD Camera #1, the system's optical reference frame. This low power diode laser beam is expanded, collimated, and reflected off of reference cubes bonded to the enclosure and the base plate. These return reference beams are directed back to the CCD Camera #1, as is the far field laser beam. This configuration allows the detection and quantification of any laser hardware motion with respect to the supporting structure, e.g., table, as well as any changes in laser pointing.

EXAMPLE

A HOMER system as shown and described herein, including the components shown and arranged as in FIGS. 1 and 2, with reference numeral 44 depicting a ½ wave-plate, and comprising a cylindrical lens having an F(cyl) of −62 cm, was constructed with mechanical, thermal, and optical tracking to verify the performance requirements for a mission. Two optical reference cubes, one for the enclosure and another for the mounting structure, as shown and described in connection with FIG. 3, were used to isolate any far field beam pointing movement to mechanical or cavity motions. Once calibrated, a laser life test was conducted wherein the set up ran for 2 years and produced over 16 Billion laser shots or pulses.

The system was operated at greater than or equal to 15 mJ pulses and 241 Hz for over 2 years and ultimately the test was paused after 16.1 billion shots. Any pulsed solid state laser of this type typically exhibits a degradation in output energy, where if no optical damage nor misalignment occurs, will be likely attributed to pump laser diode emitter loss or gradual decay in their lasing efficiency. HOMER's degradation rate was remarkably low, i.e., ~100 uJ/B, to which can be attributed a pair of features. The first feature is the heavy derating of the LDA drive parameters beginning of life (BOL) set point of 50 A (49% of peak), and a 65 µs width. The second feature is the cavity's inherent large beam area, i.e., low fluence, which kept the longitudinal mode beating to a minimum, and thus peak temporal intensity spikes that can slowly pit coatings, to an absolute minimum.

The opportunity to perform a thorough life test of any laser system is rare, due to the long term overhead costs of an effectively isolated lab space, automated housekeeping, laser operation, safety interlocks, and data processing. One of the great advantages of performing such a life test is that the results can shine new light on subtle hardware issues not typically discovered in standard table-top experiments. A life test can be used to bring hardware issues to light, adding to a list derived from TVAC and vibration tests, from which design changes can be pursued and included in a final flight design. For example, the laser cavity optics can be mounted to an aluminum truss-like optical bench that can be clamped to the laser gain module near the center of the unit. Thus, the end mirrors can be disposed at opposite ends of the truss, which if not modeled and designed thoroughly, can be sensitive to thermal gradients along its length. Furthermore, a bench design can be used to test and compensate for a small amount of gravity "sag." After construction of the cavity, staking of the fasteners, and sealing of the lid, the unit can be flipped 180° along the optic axis and mounted to titanium flexures mounted to the lid such that the laser can be tested "upside down." With this inverted optical bench design, small amounts (~50 µR) of far field pointing drift can be detected in a beam reference setup. The "gravity" drift can immediately be detectable, can be significant for this science, but can nonetheless be well within specifications. Additionally, a HOMER breadboard as exemplified in FIG. 1 can be used for extensive optical-mechanical studies to help isolate performance effects on each of the most critical optics, that is, on the end mirrors and the Nd:YAG slab. These components can be individually misaligned in pitch, yaw, X and Y translation, and the output can be recorded. The data set can be immensely beneficial in configuration upgrades as well as in flight quality modeling efforts for thermo-mechanical performance. A highly reliable laser system can thus be produced in view of the resulting data to set limits of motions. Through this data the sealed enclosure design can be critiqued as can be the effects of holding the total pointing stable when exposed to cold, heat, and the vacuum of space.

The table-top life test met the minimum mission requirements in pointing and beam quality, and readily surpassed the mission life requirement in decay rate and shot count. Extensive testing was performed to uncover subtle areas or parameters that need improvement but that are difficult to see in short term operations. The life test was very valuable as it uncovered a sensitivity in vertical pointing sensitivity to temperature, mostly due to the optical bench construction. It was noticed after 2 billion shots that the far field beam appeared to be drifting solely in the far field Y axis, yet holding pulse energy very well. It eventually rested at a total drift of ~1 mR after 8 billion shots, and remained there until the end of the experiment. This effect of subtle far field motion, beam quality, but stable pulse energy, has been replicated many times with optically equivalent breadboard HOMER laser systems. Several experiments were also conducted where the end mirrors and laser slab were independently and precisely translated and pitched to simulate a rocking motion, or seesaw effect, of the optical bench due to temperature gradients as well as gravitational sag, and the optical bench has been designed and thermally modeled to remove this effect for the first flight engineering test unit (ETU).

The LDA current was increased twice by 1 amp (~2%) after 2.5 billion shots/pulses and after 13.2 billion shots/pulses, respectively, to hold the pulse energy above 15 mJ for the test duration. The mission, the flight electronics designs, and the LDA operational margin all allow for a factor of 2× increase in the drive current and 2× increase in pump pulse width, should a highly unlikely, unpredicted LDA event occur requiring such a need. Accounting for these adjustments, and designed into mission margins, the total average decay rate of the HOMER Laser of the present invention is only 100 µJ/Billion, or only a 1 mJ drop in energy for every 10 Billion pulses.

Figure 4:
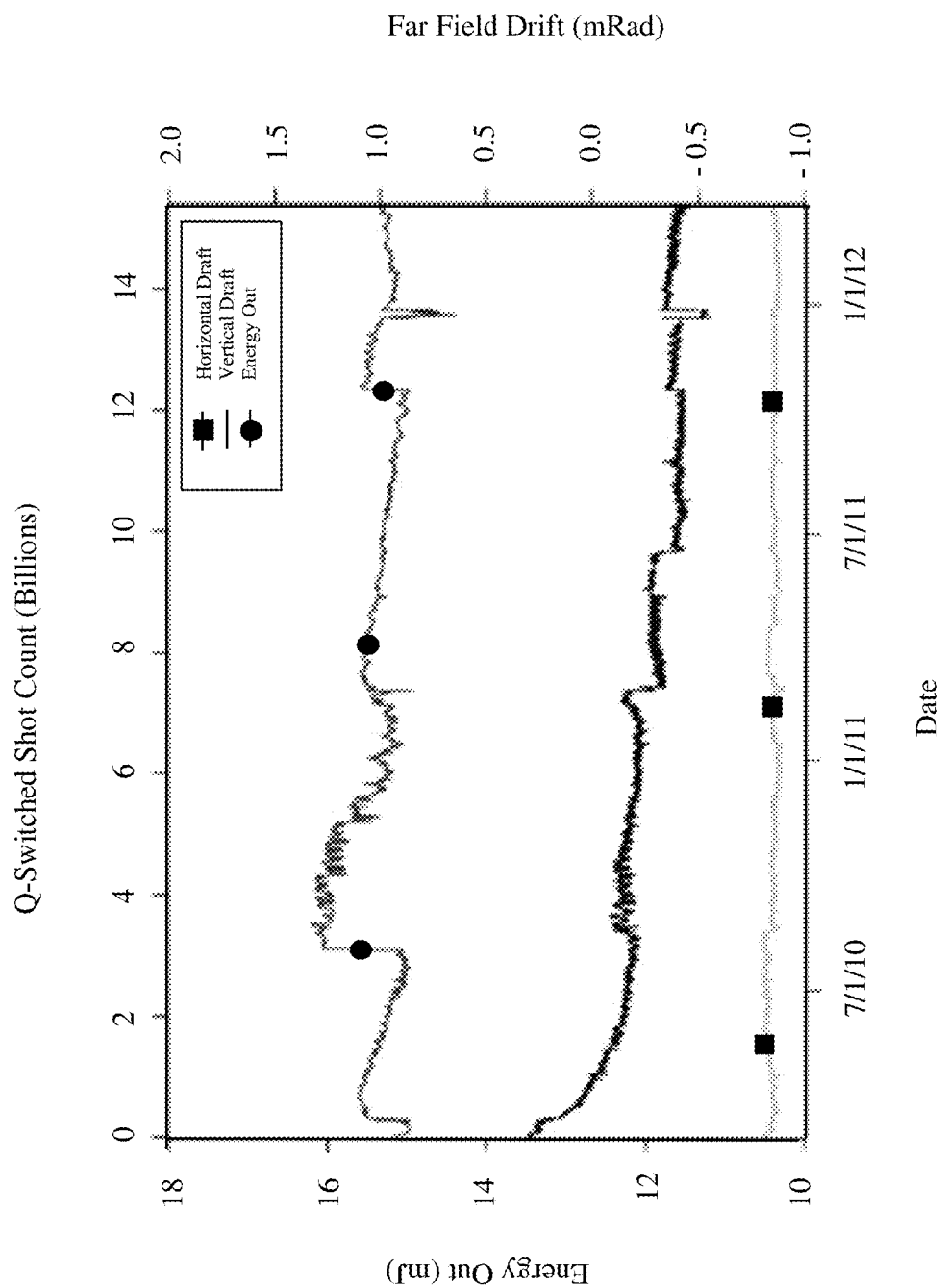
FIG. 4 is a graph showing the total shot count of the life test described in the Example below, compared with long-term absolute pointing drift.

FIG. 4 is a graph showing the total shot count of the life test (16.4 Billion) compared with the long-term absolute pointing drift. The initial drift in the Y axis is attributed to the thermo-mechanical interface of the optical bench and the laser head and its sensitivity to gravity "sag" over time, which would likely not be an issue in orbit. The overall average slope of the pulse energy was likely due to LDA fatigue, or efficiency decay, and was easily compensated for with small bumps in electrical drive parameters, pulse width, and current.

Figure 5:
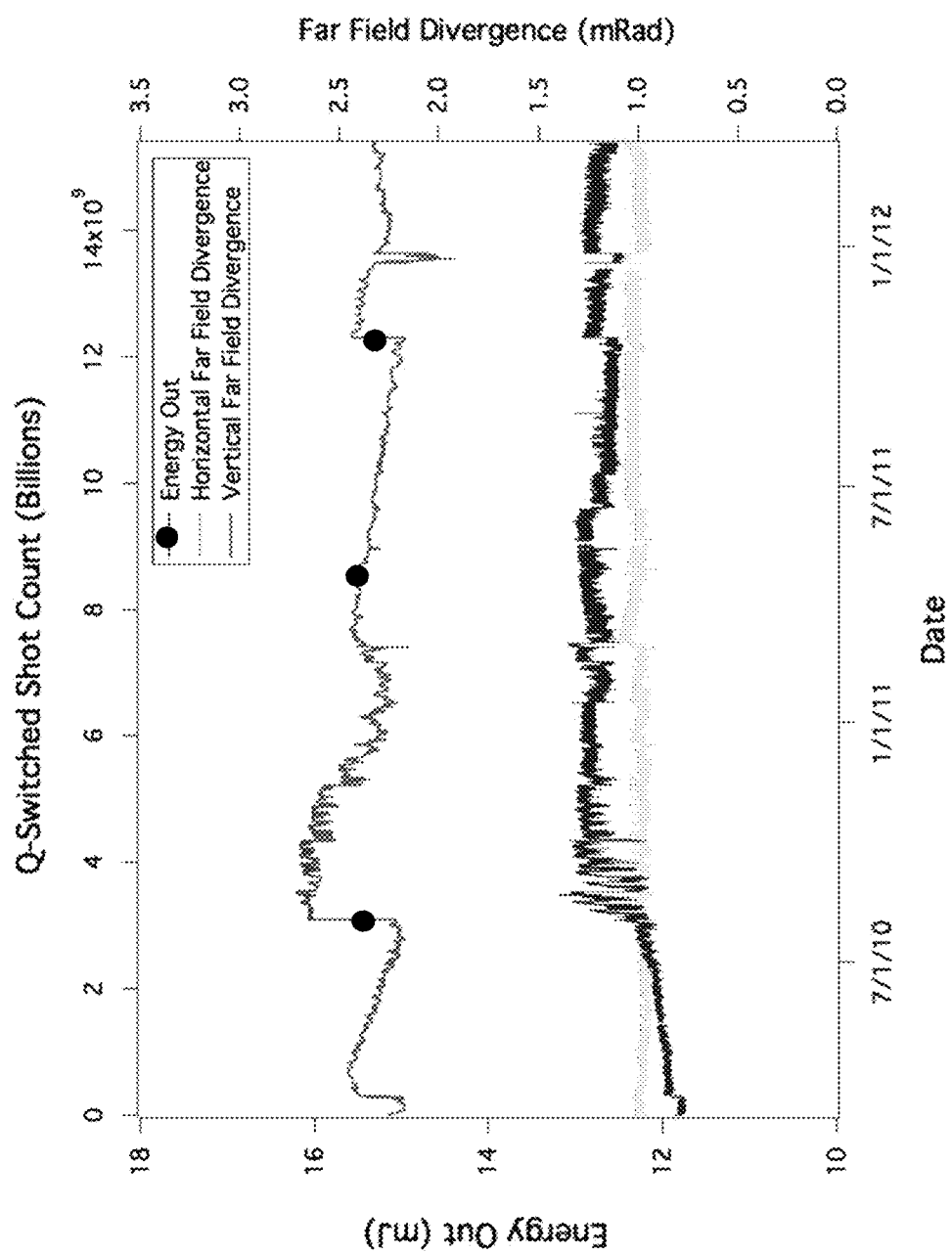
FIG. 5 is a graph showing the energy output of the laser system described in the Example below, compared with far field divergence.

FIG. 5 is a graph showing the energy output compared with the far field divergence. The initial decay of the Y-axis beam quality, independent of the X-axis, supports the gravity sag effects of the optical bench design. These results can be used to improve flight optical bench configuration changes. The optical bench and gravity-insensitive interface of the present invention have been configured based on this data to optimize the present oscillator-only cavities.

Figure 6:
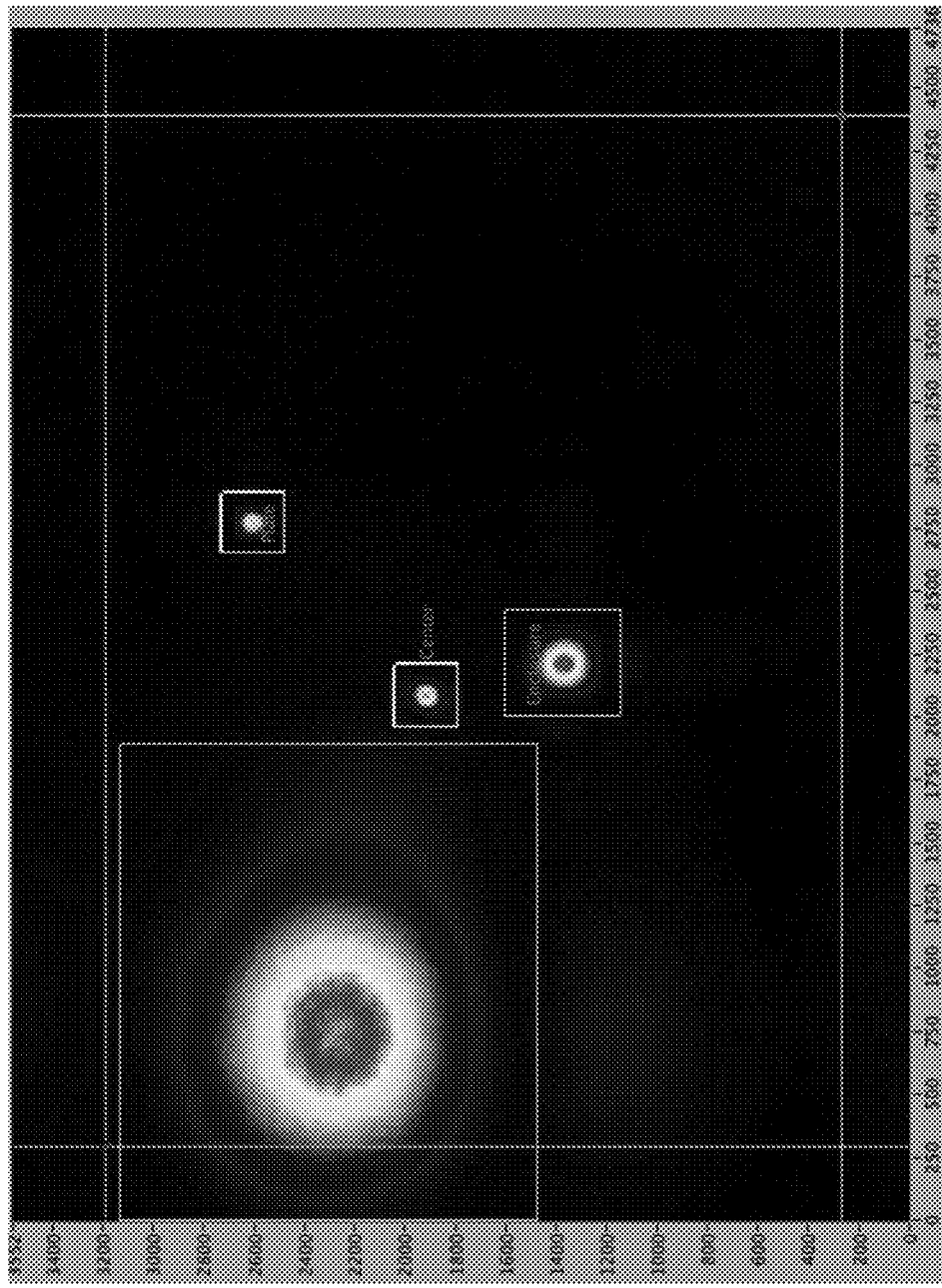
FIG. 6 is a camera image from Camera #1 shown and described in connection with FIG. 3 (reference numeral 318), and simultaneously displays all diode laser reference beams and the far field beam.

FIG. 6 is a CCD Camera #1 image simultaneously displaying all diode laser reference beams and the HOMER far field beam generated from the laser system shown in FIG. 3. The far field beam measures approximately 1.1 mR×1.2 mR and is the largest contour mode in the upper left. The axes are in microns as read by the camera software. The other three contour beams in the image are from the reference diode laser (center), and from reference cubes on the enclosure (bottom) and the mounting plate (above). Tracking these beams simultaneously allowed the detection of subtle thermomechanical and structural issues in the optical configuration, e.g., bench design, that were only quantifiable through a life test and beam tracking scheme.

The present invention includes the following numbered aspects, embodiments, and features, in any order and/or in any combination:

1. A laser system consisting essentially of:

a laser head comprising a diode-side-pumped ND:YAG slab laser configured as a zig-zag slab gain medium, the laser head configured to produce a laser beam along an optical path;

a Q-switch aligned along the optical path and configured to pulse a laser beam produced by the laser head;

a ¼ wave-plate aligned along the optical path and configured to polarize a pulsed laser beam formed by the Q-switch;

a graded reflectivity mirror aligned along the optical path and configured to partially reflect and partially transmit a polarized, pulsed laser beam produced by the ¼ wave-plate, and to form a reflected laser beam along a reflected optical path;

a cylindrical lens aligned along the reflected optical path and configured to focus a reflected laser beam; and a high reflectivity mirror aligned along the reflected optical path and configured to reflect a focused reflected laser beam produced by the cylindrical lens.

2. The laser system of any preceding or following embodiment/feature/aspect, wherein the assembly includes, arranged in order, an aluminum diode block, a 7×4 bar of laser Doppler anemometers, an aluminum laser head bridge, an undoped:YAG pump lens, a cylindrical pump lens rack, a 22 bounce ND:YAG slab gain medium, a slab heat sink, and a thermal compensating lens.

3. The laser system of any preceding or following embodiment/feature/aspect, wherein the pump lens is cylindrical and has an F(cyl) of from −60 cm to −65 cm.

4. The laser system of any preceding or following embodiment/feature/aspect, wherein the pump lens has an F(cyl) of −62 cm.

5. The laser system of any preceding or following embodiment/feature/aspect, wherein the laser system is configured to hold average internal fluences to below 3.0 J/cm$^2$.

6. The laser system of any preceding or following embodiment/feature/aspect, wherein the laser system is configured to hold average internal fluences to below 2.0 J/cm$^2$.

7. The laser system of any preceding or following embodiment/feature/aspect, further consisting essentially of an enclosure, wherein the components are housed within the enclosure.

8. A laser system of any preceding or following embodiment/feature/aspect, configured to direct a transmitted, polarized, pulsed laser beam exiting the enclosure, directly toward a surface of the Earth.

9. The laser system of any preceding or following embodiment/feature/aspect, wherein the enclosure has a single aperture, and the single aperture is configured to transmit a polarized, pulsed laser beam from the graded reflectivity mirror along the optical path to be output from the enclosure.

10. In combination, the laser system of any preceding or following embodiment/feature/aspect and a spacecraft, wherein the laser system is mounted in or on the spacecraft and is configured to direct a transmitted, polarized, pulsed laser beam exiting the enclosure, directly toward a surface of the Earth.

11. The combination of any preceding or following embodiment/feature/aspect, wherein the spacecraft is configured to direct a transmitted, polarized, pulsed laser beam exiting the enclosure, directly toward biomass on the surface of the Earth.

12. The combination of any preceding or following embodiment/feature/aspect, wherein the spacecraft is configured to direct a transmitted, polarized, pulsed laser beam exiting the enclosure, directly toward biomass on the surface of the Earth, and to turn off the laser system when the spacecraft is in orbit above water-covered surfaces of the Earth, such as the Earth's oceans.

13. A method of forming 10 mJ TEM$_{00}$ laser pulses, comprising forming laser pulses with the laser system of any preceding or following embodiment/feature/aspect, without further amplification.

14. A method of forming 15 mJ TEM$_{00}$ laser pulses, comprising forming laser pulses with the laser system of any preceding or following embodiment/feature/aspect, without further amplification.

15. A method of analyzing global ecosystems, comprising:

generating and directing pulsed laser beams from a laser system according to any preceding or following embodiment/feature/aspect, from a spacecraft, toward a surface of the Earth; and analyzing reflected laser light returning to the spacecraft after reflecting off of the surface of the Earth.

16. The method of any preceding or following embodiment/feature/aspect further comprising calculating the density of biomass at the surface of the Earth based on the reflected laser light.

17. The method of any preceding or following embodiment/feature/aspect, wherein the generating and directing comprises producing 15 mJ TEM$_{00}$ laser pulses with the laser system and pulsing such laser pulses toward the Earth for at least two years.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Unless otherwise noted, the term "about" includes deviations of plus or minus 5% of the particular value modified by the term.

Unless otherwise noted, the phrase "consisting essentially of" as used herein refers to a system as described and claimed herein without any amplifiers or amplification components other than the components specified or claimed.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A laser system consisting essentially of the following components:
   a laser head comprising a diode-side-pumped ND:YAG slab laser configured as a zig-zag slab gain medium, the laser head configured to produce a laser beam along an optical path;
   a Q-switch aligned along the optical path and configured to pulse a laser beam produced by the laser head;
   a ¼ wave-plate aligned along the optical path and configured to polarize a pulsed laser beam formed by the Q-switch;
   a graded reflectivity mirror aligned along the optical path and configured to partially reflect and partially transmit a polarized, pulsed laser beam produced by the ¼ wave-plate, and to form a reflected laser beam along a reflected optical path;
   a cylindrical lens aligned along the reflected optical path and configured to focus a reflected laser beam; and
   a high reflectivity mirror aligned along the reflected optical path and configured to reflect a focused reflected laser beam produced by the cylindrical lens.

2. The laser system of claim 1, wherein the laser system is configured to hold average internal fluences to below 3.0 $J/cm^2$.

3. The laser system of claim 1, wherein the laser system is configured to hold average internal fluences to below 2.0 $J/cm^2$.

4. The laser system of claim 1, further consisting essentially of an enclosure, wherein the components are housed within the enclosure.

5. A laser system of claim 4, configured to direct a transmitted, polarized, pulsed laser beam exiting the enclosure, directly toward a surface of the Earth.

6. The laser system of claim 4, wherein the enclosure has a single aperture, and the single aperture is configured to transmit a polarized, pulsed laser beam from the graded reflectivity mirror along the optical path to be output from the enclosure.

7. In combination, the laser system of claim 4 and a spacecraft, wherein the laser system is mounted in or on the spacecraft and is configured to direct a transmitted, polarized, pulsed laser beam exiting the enclosure, directly toward a surface of the Earth.

8. The combination of claim 7, wherein the spacecraft is configured to direct a transmitted, polarized, pulsed laser beam exiting the enclosure, directly toward biomass on the surface of the Earth.

9. The combination of claim 7, wherein the spacecraft is configured to direct a transmitted, polarized, pulsed laser beam exiting the enclosure, directly toward biomass on the surface of the Earth, and to turn off the laser system when the spacecraft is in orbit above water-covered surfaces of the Earth.

10. A method of forming 7 mJ $TEM_{00}$ laser pulses, comprising forming laser pulses with the laser system of claim 1, without further amplification.

11. A method of forming 15 mJ $TEM_{00}$ laser pulses, comprising forming laser pulses with the laser system of claim 1, without further amplification.

12. A method of analyzing global ecosystems, comprising:
   generating and directing pulsed laser beams from a laser system according to claim 1, from a spacecraft, toward a surface of the Earth; and
   analyzing reflected laser light returning to the spacecraft after reflecting off of the surface of the Earth.

13. The method of claim 12 further comprising calculating the density of biomass at the surface of the Earth based on the reflected laser light.

14. The method of claim 12, wherein the generating and directing comprises producing 15 mJ $TEM_{00}$ laser pulses with the laser system and pulsing such laser pulses toward the Earth for at least two years.

* * * * *